(12) United States Patent
Chen et al.

(10) Patent No.: US 8,253,403 B2
(45) Date of Patent: Aug. 28, 2012

(54) CONVERTING CIRCUIT AND CONTROLLER FOR CONTROLLING THE SAME

(75) Inventors: Ji-Ming Chen, Wuxi (CN); Chung-Che Yu, Taipei County (TW)

(73) Assignee: Green Solution Technology Co., Ltd., New Taipei (TW)

( * ) Notice: Subject to any disclaimer, the term of this patent is extended or adjusted under 35 U.S.C. 154(b) by 396 days.

(21) Appl. No.: 12/623,450

(22) Filed: Nov. 23, 2009

(65) Prior Publication Data

US 2010/0148741 A1 Jun. 17, 2010

(30) Foreign Application Priority Data

Dec. 16, 2008 (TW) .............................. 97148845 A
Jan. 20, 2009 (TW) .............................. 98101963 A

(51) Int. Cl.
*G05F 1/44* (2006.01)
(52) U.S. Cl. ...................................................... 323/282
(58) Field of Classification Search .................. 323/280, 323/282–285, 288–290, 351
See application file for complete search history.

(56) References Cited

U.S. PATENT DOCUMENTS

| | | | |
|---|---|---|---|
| 5,481,178 A * | 1/1996 | Wilcox et al. ................. 323/287 |
| 6,580,258 B2 * | 6/2003 | Wilcox et al. ................. 323/282 |
| 6,828,766 B2 * | 12/2004 | Corva et al. ................... 323/284 |
| 6,949,885 B2 * | 9/2005 | Hamamoto et al. ......... 315/200 R |
| 7,304,464 B2 * | 12/2007 | Weng et al. .................... 323/285 |
| 7,362,595 B2 * | 4/2008 | Noma ............................... 363/59 |
| 7,492,140 B2 * | 2/2009 | Solivan et al. ................. 323/284 |
| 7,576,530 B2 * | 8/2009 | Nishida .......................... 323/285 |
| 7,598,715 B1 * | 10/2009 | Hariman et al. ............... 323/271 |
| 7,609,042 B2 * | 10/2009 | Kokubun et al. .............. 323/284 |
| 7,629,778 B2 * | 12/2009 | Liu ................................. 323/222 |
| 7,872,456 B2 * | 1/2011 | Li et al. ......................... 323/224 |
| 7,936,158 B2 * | 5/2011 | Noda ............................. 323/282 |
| 7,990,119 B2 * | 8/2011 | Petty ............................. 323/273 |
| 2004/0212318 A1 * | 10/2004 | Hamamoto et al. ......... 315/200 R |
| 2006/0082353 A1 * | 4/2006 | Solivan et al. ................. 323/282 |
| 2006/0091872 A1 * | 5/2006 | Matsuura ....................... 323/283 |
| 2009/0167273 A1 * | 7/2009 | Liu ................................. 323/285 |

FOREIGN PATENT DOCUMENTS

CN 1711670 12/2005

OTHER PUBLICATIONS

"First Office Action of China Counterpart Application", issued Dec. 8, 2011, pp. 1-4, in which the listed reference was cited.

* cited by examiner

*Primary Examiner* — Adolf Berhane
(74) *Attorney, Agent, or Firm* — Jianq Chyun IP Office

(57) ABSTRACT

The present invention uses a discharge path to release the power stored in an output capacitor of a converting circuit when the time interval between two adjacent switching thereof is too long and may generate noises whose frequencies can be sensed by human ears. Hence, the present invention can keep the operating frequency of the converting circuit higher than a predetermined frequency and reduce the audio noise of the converting circuit.

26 Claims, 9 Drawing Sheets

US 8,253,403 B2

CONVERTING CIRCUIT AND CONTROLLER FOR CONTROLLING THE SAME

CROSS-REFERENCE TO RELATED APPLICATION

This application claims the priority benefits of Taiwan patent application serial no. 97148845, filed on Dec. 16, 2008, and application serial no. 98101963, filed on Jan. 20, 2009. The entirety of each of the above-mentioned patent applications is hereby incorporated by reference herein and made a part of specification.

BACKGROUND OF THE INVENTION (1) Field of the Invention

The present invention relates to a converting circuit and a controller for controlling the same, and more particularly to a converting circuit for reducing audible noise and a controller for controlling the same.

(2) Description of the Prior Art

FIG. 1 is a schematic circuit diagram of a DC-DC buck converter in the conventional arts, which is utilized for converting a DC input voltage Vin into a DC output voltage Vout. The DC-DC buck converter has a first switch Q1, a second switch Q2, an inductor L, a capacitor C, a voltage detector 50, a current detector RCS, and a controller, and the controller has a current sensing amplifier 10, an error amplifier 20, a pulse width modulated (PWM) comparator 30, and a skip mode controller 40. The first switch Q1 and the second switch Q2 are connected in serial between a DC input Vin and ground. The inductor L and the capacitor C, which are connected in serial between ground and a connecting point of the first switch Q1 and the second switch Q2, are utilized for generating the DC output voltage Vout. The current detector RCS is coupled to the inductor L for detecting the current on the inductor L and generates a current detecting signal CS. The voltage detector 50 is coupled to the capacitor C to detect the DC output voltage Vout and generates a voltage detecting signal VS.

A non-inverting terminal of the error amplifier 20 receives the voltage detecting signal VS and an inverting terminal thereof receives a reference voltage signal VREF. The output signal of the error amplifier 20 is compensated by a compensating circuit RCcomp at an output terminal of the error amplifier 20 to generate an error amplified signal EA. The PWM comparator 30 compares the error amplified signal EA with the sum of the current detecting signal CS and a slope compensating signal Slope and accordingly generates a comparing signal Comp. The skip mode controller 40 receives the comparing signal Comp and the current detecting signal CS and accordingly generates a first controlling signal UGATE and a second controlling signal LGATE for controlling the switching of the first switch Q1 and the second switch Q2, respectively.

When the DC output voltage Vout is lower than a predetermined voltage, the skip mode controller 40 turns the first switch Q1 on and turns the second switch Q2 off so that the current form the DC input voltage Vin charges the capacitor C for increasing the voltage level of the DC output voltage Vout. When the sum of the current detecting signal CS and the slope compensating signal Slope increases to reach the level of the error amplified EA, the first switch Q1 is turned off and the second switch Q2 is turned on so that the current from the inductor L continues to flow through the second switch Q2. When the current on the inductor is going to reverse (i.e.: the capacitor C is going to be turned from charging status into discharging status), the second switch Q2 is turned off but the first switch Q1 remains to be turned off. At this time, the DC-DC buck converter continues to provide electronic power to a load through the capacitor C. In the next period, when the DC output voltage Vout is lower than the predetermined voltage, the skip mode controller 40 turns the first switch Q1 on and turns the second switch Q2 off once again to charge the capacitor C for increasing the voltage level of the DC output voltage Vout. Thus, the cycle mentioned above repeats to allow the DC output voltage Vout stabled around the predetermined voltage.

If the load is so light that the DC output voltage Vout is still larger than the predetermined voltage in the above mentioned next period, the skip mode controller 40 will enter the skip mode from the normal mode as described above to keep the first switch Q1 and the second switch Q2 being turned off until the DC output voltage Vout declined below the predetermined voltage. However, if the time interval between the adjacent time points that the first switch Q1 being turned on is within the human hearing range, which is ranged between 20 Hz to 20 kHz, audible noise would be generated.

SUMMARY OF THE INVENTION

Although the DC-DC buck converter of the conventional arts is able to decrease amount of switching of the transistors to lower switching loss, but the problem of audible noise raised. The present invention provides a converting circuit for reducing audible noise and a controller for controlling the same, which use a discharging path to discharge the stored energy of the converting circuit, and so the converting circuit and the controller can be forced to operate at a frequency beside the human hearing range of 20 Hz to 20 kHz for avoiding the audible noise.

The primary objective of the present invention is to achieve the foregoing advantages. Accordingly, the present invention provides a converting circuit, which comprises a converting module, a controller, and a discharging circuit. The converting module converts an input voltage into an output voltage, which comprises a first switching unit, an energy storage unit, and a capacitance unit. The first switching unit is coupled between the input voltage and the energy storage unit. One end of the capacitance unit is coupled to the energy storage unit to provide the output voltage to a load. The controller generates a first controlling signal to control the first switching unit according to a current detecting signal indicative of a current through the energy storage unit and a voltage detecting signal indicative of the output voltage. The discharging circuit is coupled to the capacitance unit for discharging the stored energy of the capacitance unit.

The present invention also provides a converting controller for controlling a converting module to convert an input voltage into an output voltage. The converting controller comprises a first detecting unit, a second detecting unit, and a driving unit. The first detecting unit generates a voltage feedback signal according to the output voltage. The second detecting unit generates a current judging signal according to a current of the converting module. The driving unit receives the voltage feedback signal and the current judging signal and accordingly generates a controlling signal for controlling the converting module to maintain the output voltage higher than a predetermined voltage level. Wherein, the first detecting unit is coupled to a capacitance unit of the converting module to continue discharging the stored energy of the capacitance unit and thereby the time interval between two adjacent time points that the controlling signal being generated by the controller is shorter than the human hearing range.

The present invention also provides a method for reducing audible noise of a converting circuit. The method comprises the steps of: (a) determining a discharging resistance value according to a predetermined output voltage, a predetermined period, and a minimum energy transmitted by a converting module in an operating period, wherein the converting module is controlled by a controlling signal of a controller; and (b) coupling a discharging circuit to a capacitance unit of the converting module, wherein a resistance value of the discharging circuit is determined according to the discharging resistance value and thereby a time interval of the generated controlling signals is short than or equal to the predetermined period.

The above and other objects, features and advantages of the present invention will become apparent from the following detailed description taken with the accompanying drawing.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The spirit of the present invention is to use a discharging path to maintain the lowest switching frequency of switching unit in a converting module than the human hearing range for avoiding the audible noise. The discharging path is a continuously discharging path or a controlled discharging path.

Figure 1:
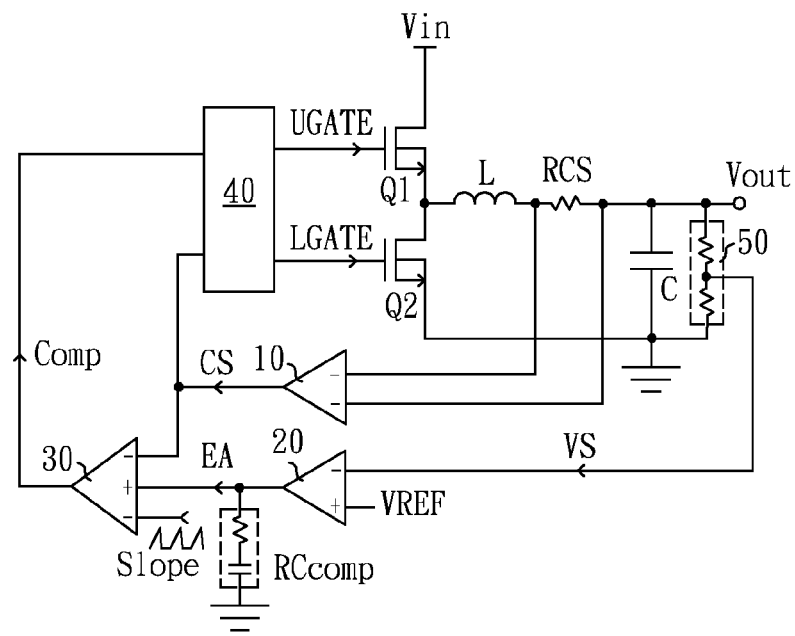
FIG. 1 is a schematic circuit diagram of a DC-DC buck converter in the conventional arts.
Figure 2A:
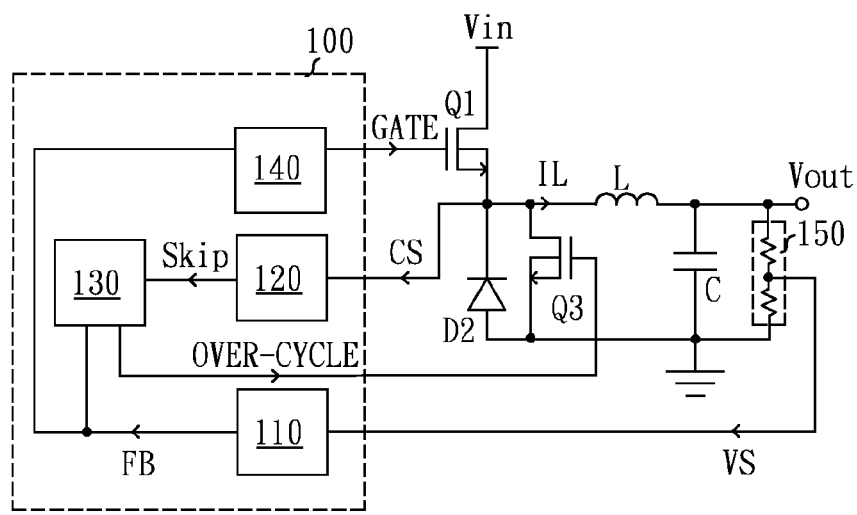
FIG. 2A is a schematic block diagram of a DC-DC converting circuit for reducing audible noise in a preferred embodiment according to the present invention.

Please refer to FIG. 2A, it is a schematic block diagram of a DC-DC converting circuit for reducing audible noise in a preferred embodiment according to the present invention. The DC-DC converting circuit, which is used to convert an input voltage Vin into an output voltage Vout, comprises a converting module, a noise avoiding unit Q3, and a controller 100. The converting module comprises a first switching unit Q1, a synchronous diode D2, an inductor L as an energy storage unit, a capacitor C, and a voltage detector 150. The controller 100 comprises a first detecting unit 110, a second detecting unit 120, a period judging unit 130, and a driving unit 140. The controller 100 receives a current detecting signal CS indicative of a current on the inductor L and a voltage detecting signal VS indicative of the output voltage Vout, and generates a controlling signal GATE accordingly. The first switching unit Q1 is coupled to the input voltage Vin and the inductor L, and switched according to the controlling signal GATE generated by the controller 100. When the first switching unit Q1 is turned on, the electronic power from the input voltage Vin is stored in the inductor L. When the first switching unit Q1 is turned off, the energy stored in the inductor L is released to a load (not shown). A negative end of the synchronous diode D2 is coupled to the first switching unit Q1, and a positive end of the synchronous diode D2 is grounded. The synchronous diode D2 functions as an energy-releasing path of the inductor L when the first switching unit Q1 is turned off. The voltage detector 150 detects the output voltage Vout to generate the voltage detecting signal VS. The capacitor C could be replaced by any energy storage unit with capacitive component. One end of the noise avoiding unit Q3 is coupled to the inductor L in the converting circuit and the other end thereof is grounded. The noise avoiding unit Q3 might be a transistor switch as a controlled discharging path.

The first detecting unit 110 is coupled to the voltage detector 150 to receive the voltage detecting signal VS and generates a voltage feedback signal FB when the output voltage Vout is lower than a predetermined voltage level. The second detecting unit 120 is coupled to the inductor L to receive the current detecting signal CS indicative of the inductor current IL flowing through the inductor L and generates a current judging signal Skip when the inductor current IL is lower than a predetermined current value. The second detecting unit 120 may be stooped to detect the current detecting signal CS when the first switching unit Q1 is turned on. The period judging unit 130 is coupled to the first detecting unit 110 and the second detecting unit 120 for receiving the current judging signal Skip and the voltage feedback signal FB and generates a noise-avoiding signal OVER-CYCLE to control the noise avoiding unit Q3 when the received current judging signal Skip lasts over a first predetermined period and the voltage feedback signal FB is also received. The driving unit 140 receives the voltage feedback signal FB, and generates the controlling signal GATE when the output voltage Vout is lower than the predetermined voltage level.

The noise avoiding unit Q3 is controlled by the generated noise-avoiding signal OVER-CYCLE to have the inductor L coupled to a reference voltage level, such as a grounding voltage level, so as to have the energy stored in the capacitor C released through the inductor L and the noise avoiding unit Q3 to generate a current. Meanwhile, the current passes through the inductor L to store energy in the inductor L. Generally, the noise-avoiding signal OVER-CYCLE can be set to last for a second predetermined period to have the inductor L to store energy. Therefore, the time interval of the adjacent time points that the inductor current is generated shorter than the human hearing range. That is, the time interval should be corresponding to a frequency higher than 20000 Hz to show the noise-avoiding function.

Figure 2B:
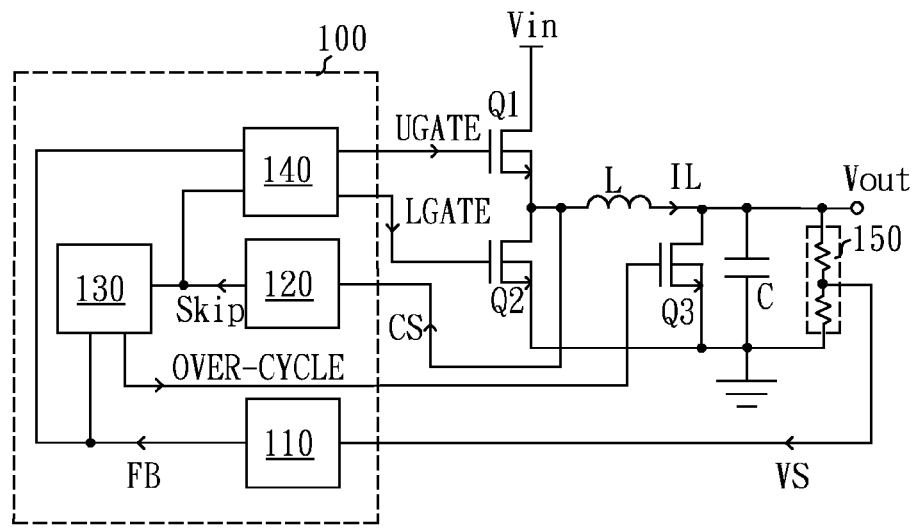
FIG. 2B is a schematic block diagram of a DC-DC converting circuit for reducing audible noise in another preferred embodiment according to the present invention.

FIG. 2B is a block diagram showing another preferred embodiment of a DC-to-DC converting circuit for reducing audible noise according to the present invention. In contrast with the embodiment as shown in FIG. 2A, the noise avoiding unit Q3 in the present embodiment has one end coupled to the inductor L and the capacitor C and the other end grounded, and the synchronous diode D2 in FIG. 2A is replaced by a second switch Q2. In addition, signal transmission inside the controller 100 is also different from that of the embodiment in FIG. 2A.

As shown in FIG. 2B, the first detecting unit 110 is coupled to the voltage detector 150 for accessing the voltage detecting signal VS. The first detecting unit 110 generates a voltage feedback signal FB when the output voltage Vout is lower than a predetermined voltage level. The second detecting unit 120 is coupled to the inductor L for accessing the current detecting signal CS representing the inductor current IL. The second detecting unit 120 generates a current judging signal Skip when the inductor current IL is smaller than a predetermined current value. The period judging unit 130 receives the current judging signal Skip and the voltage feedback signal FB. When the time interval between neighboring voltage feedback signals FB longer than the first predetermined period, a noise-avoiding signal OVER-CYCLE is generated to control the noise avoiding unit Q3, which acts as a discharging path in the converting circuit. The driving unit 140 receives the voltage feedback signal FB and the current judging signal Skip. When the output voltage Vout is lower than the predetermined voltage level, the first controlling signal UGATE is generated to store the input energy in the inductor L through the first switching unit Q1. When the output voltage Vout is higher than the predetermined voltage level and the inductor current IL is greater than the predetermined current value, the second controlling signal LGATE is generated to have the energy stored in the inductor L charging the capacitor C through the second switching unit Q2. When the output voltage Vout is higher than the predetermined voltage level and the inductor current IL is smaller than the predetermined current value, the first controlling signal UGATE and the second controlling signal LGATE are stopped to turn off the first switching unit Q1 and the second switching unit Q2.

The noise avoiding unit Q3 is controlled by the noise-avoiding signal OVER-CYCLE to have the capacitor C coupled to a reference voltage level, such as a grounding voltage level. Thereby, the energy stored in the capacitor C would be released through the noise avoiding unit Q3 to have the output voltage Vout decreased below the predetermined voltage level. Generally, the noise-avoiding signal OVER-CYCLE can be set to last for a second predetermined period or to last until the generation of the first controlling signal UGATE. Thereby, the time interval that the inductor current generated on the inductor L would be shorter than human hearing range. That is, the time interval would be corresponding to a frequency higher than 20000 Hz to show the noise-avoiding function.

It is understood that the audible noise is generated as the currentless period of the inductor L falls within the human hearing range. Although the time interval of the neighboring voltage feedback signals FB or the neighboring first controlling signals UGATE is longer than the currentless time period of the inductor L (when the circuit enters discontinuous current mode) and one (or two) operation period of the controller 100, but the operation period of the controller 100 can be neglected because the controller 100 is operated at high frequency of 200 kHz or above. Therefore, in the present embodiment, the judgement can be carried out by using the time interval between two neighboring voltage feedback signals FB to decide whether the noise-avoiding signal OVER-CYCLE is needed to reduce audible noise.

Figure 2C:
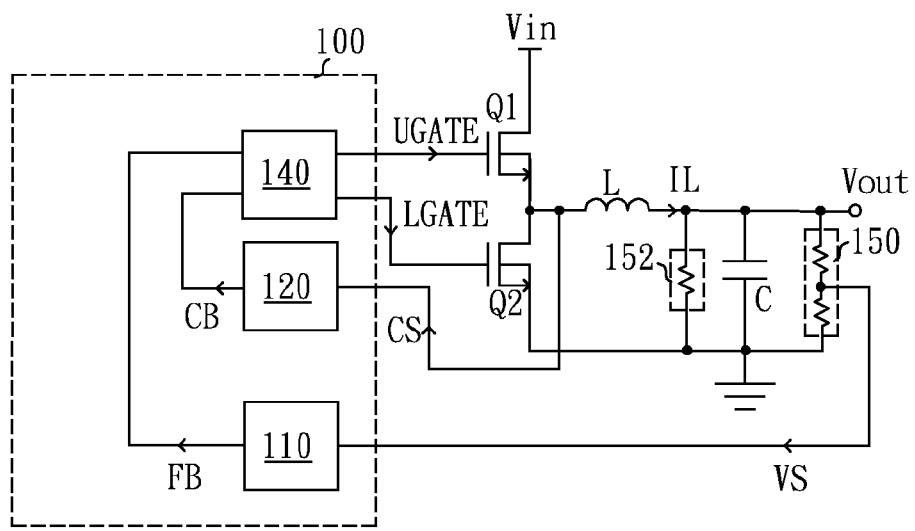
FIG. 2C is a schematic block diagram of a DC-DC converting circuit for reducing audible noise in still another preferred embodiment according to the present invention.

FIG. 2C is a block diagram showing a preferred embodiment of a DC-to-DC converting circuit for reducing audible noise in accordance with the present invention. The DC-to-DC converting circuit includes a converting module, a discharging circuit 152, and a controller 100. In contrast with the embodiment of FIG. 2B the discharging circuit 152 provided in the present embodiment forms a continuous discharging path coupled to the capacitor C of the converting module to release the energy stored in the capacitor C. Thereby, the switching unit in the converting circuit should is able to be switched at a frequency above the human hearing range to maintain the output voltage Vout even when the DC-to-DC converting circuit is light-loaded or unloaded.

The first detecting unit 110 is coupled to the voltage detector 150 for accessing the voltage detecting signal VS and generates a voltage feedback signal FB when the output voltage Vout lower than a predetermined voltage level. The second detecting unit 120 is coupled to the inductor L for accessing the current detecting signal CS representing the inductor current and generates a current feedback signal CB based on the current detecting signal CS. The driving unit 140 receives the voltage feedback signal FB and the current feedback signal CB to generate a first controlling signal UGATE and a second controlling signal LGATE to control the first switching unit Q1 and the second switching unit Q2 respectively.

As mentioned, the present embodiment does not need the period judging unit 130 for generating the controlling signal to turn on the discharging path. Therefore, the circuit in the present embodiment is simpler and cheaper. The discharging circuit 152 in the present embodiment may be a resistor for example. The resistance of the resistor is selected according to the minimum operating period (i.e.: the period of the minimum duty cycle) of the controlling signal from the controller 100 and a predetermined period, so that the voltage level of the output voltage Vout from the capacitor C would be reduced below the predetermined voltage level in the predetermined period so as to activate the controller 100 to turn on the first switching unit Q1 to generate inductor current. In the present embodiment, the discharging circuit 152 is a resistor. However, the present invention is not so limited. In practice, the existed circuit, such as the circuit in the voltage detector 150 or the first detecting unit 110, can be used as the discharging path directly.

The equivalent resistance of the discharging circuit 152 is decided by the energy transmitted in the minimum operating period of the controller 100 and the predetermined period. The predetermined period is shorter than human hearing range, which is about 50 us.

Take a boost converter for example. The controller 100 is operated with minimum operating period when light loaded and the energy transmitted in each operating period, which is identical to the energy stored in the inductor L, is:

$$\frac{1}{2}Li^2 = \frac{1}{2}L*\left(\frac{Vin*Ton\min}{L}\right)^2 \quad (1)$$

Wherein, i is the maximum current on the inductor L during the minimum operating period and Tonmin is the minimum operating period of the controller 100.

The energy released by the discharging circuit 152 within the predetermined period Tau is:

$$\frac{Vout^2}{R} * Tau \quad (2)$$

Wherein, R is the equivalent resistance value of the discharging circuit 152.

Because the energy stored in the inductor is identical to the energy released by the discharging circuit, the ideal equivalent resistance value can be derived as follow:

$$R = \frac{L*Tau}{2*Tonmin^2}\left(\frac{Vout}{Vin}\right)^2 = \frac{L*Tau}{2}*\left(\frac{G}{Tonmin}\right)^2 \quad (3)$$

Wherein, G is the voltage ratio of the output voltage Vout and the input voltage Vin.

The above calculation describes a simplified condition, which neglects the converting efficiency and variation of the output voltage. In addition, the converting circuit may have other interior loss to result in a shorter discharging interval of the discharging circuit. That is, as the equivalent resistance R derived in function (3) is used, the resulted switching period would be smaller than the predetermined period Tau. Therefore, the equivalent resistance of the discharging circuit may be tuned according the actual circuit condition to have the switching period identical or shorter than 50 us so as to reduce amount of switching and switching loss.

Take a buck converter for example. The controller 100 is operated with the minimum operating period when light-loaded and the energy transmitted in each operating period, which is stored in the inductor L and the conductor, is:

$$\frac{1}{2}Li^2 + \frac{1}{2}C(Vout'^2 - Vout^2) = \quad (4)$$

$$\frac{1}{2}L*\left(\frac{Vin*Tonmin}{L}\right)^2 + \frac{1}{2}C\left[\left(Vout + \frac{i*Tonmin^2}{2*C}\right)^2 - Vout^2\right]$$

Wherein, i is the maximum current on the inductor during the minimum operating period, Vout' is the voltage level crossing the capacitor when the current on the inductor reaches maximum, which is calculated by using the function: Vout'=Vout+ΔQ/C, wherein C is capacitance of the output capacitor.

The equivalent resistance of the discharging circuit can be derived by using the functions (2) and (4).

Moreover, the present invention focuses on reducing the audible noise of the converting circuit, which is generated by the intermittent current on the inductive component. Thus, the present invention can be adopted in the converting circuit with a transformer or other inductive energy storage unit, which includes AC-to-DC converting circuit, AC-to-AC converting circuit, and DC-to-AC converting circuit. In addition, the driving unit 140 in the present invention may be a skip mode PWM controller or a PFM controller. Therefore, the present invention has a broad field of application.

Figure 3A:
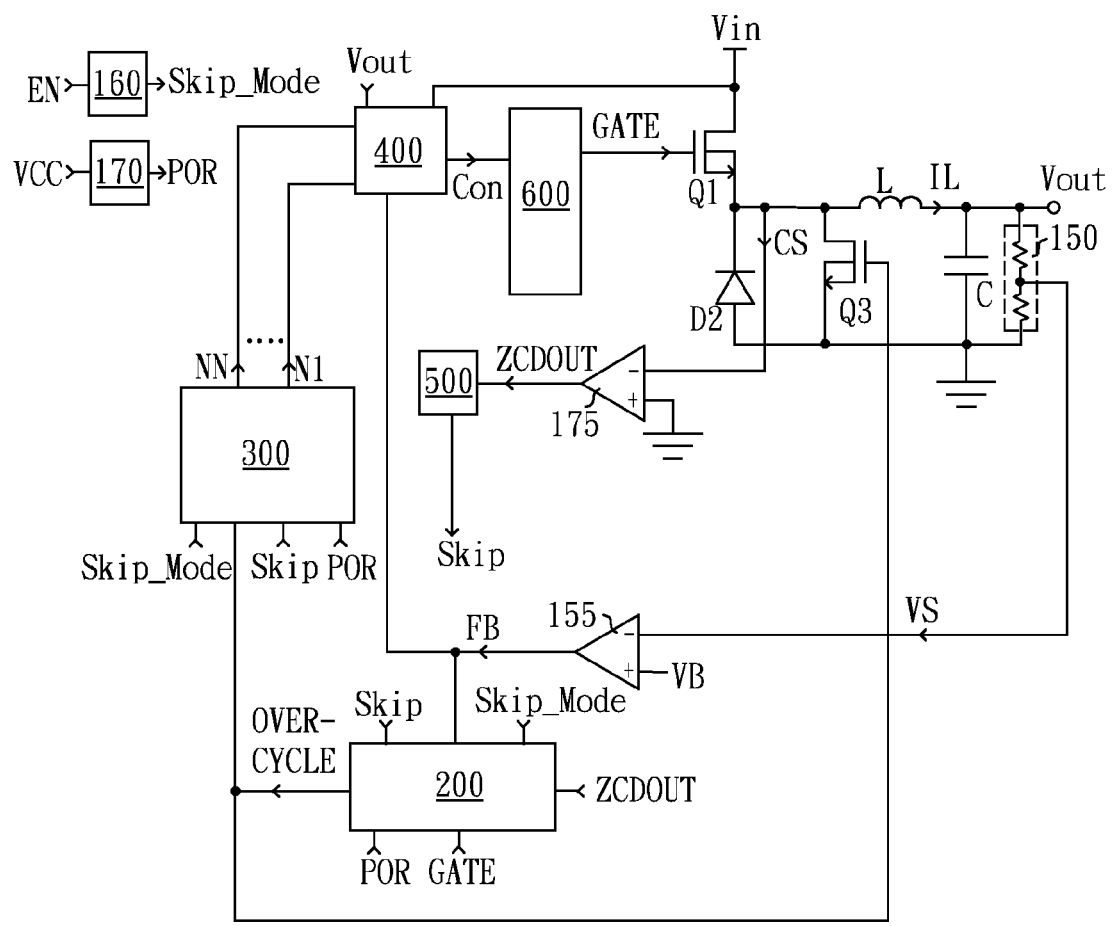
FIG. 3A is a schematic circuit diagram of the DC-DC converting circuit for reducing audible noise corresponding to the embodiment shown in FIG. 2A.

FIG. 3A is a circuit diagram corresponding to the DC-to-DC converting circuit for reducing audible noise as shown in FIG. 2A. As shown, the controller in the present embodiment is a PWM controller with adjustable turn-on period, which includes a first detecting unit, a second detecting unit, a period judging unit, and a driving unit. The first detecting unit has a zero crossing comparator 175 and a skip-mode judging unit 500. The second detecting unit has a feedback detecting unit 155. The period judging unit has an operating period detecting unit 200. The driving unit has a turn-on period controlling unit 300, a pulse generating unit 400, and a driver 600. The controller in the present embodiment further has a skip-mode enabling unit 160 and a circuit reset unit 170. The skip-mode enabling unit 160 receives an enabling signal EN to generate a skip-mode controlling signal Skip_Mode. Thereby, the users can decide whether the controller is able to enter the skip mode or not according to the applications. The circuit reset unit 170 is utilized to generate a pulse reset signal POR according to the power voltage level VCC of the controller. That is, as the power voltage level VCC reaches an activating voltage level, the pulse reset signal POR is generated to reset the components within the controller.

The feedback detecting unit 155 may be a comparator, which has a non-inverting terminal receiving a reference voltage VB, an inverting terminal receiving a voltage detecting signal VS from the voltage detector 150, and an output end outputting a voltage feedback signal FB. The zero crossing comparator 175 has an inverting terminal receiving the current detecting signal CS, a non-inverting terminal grounded or connected to a positive reference voltage close to 0V, and an output end outputting a zero judging signal ZCDOUT. The skip-mode judging unit 500 receives the zero judging signal ZCDOUT, generates a current judging signal Skip when the zero judging signal ZCDOUT indicate that the voltage level crosses zero and keeps the current judging signal Skip. The skip-mode judging unit 500 also detects whether the present operating period has a corresponding zero judging signal ZCDOUT being generated and keeps the current judging signal Skip until no zero judging signal ZCDOUT being generated. The operating period detecting unit 200 receives the reset signal POR, the voltage feedback signal FB, the skip-mode controlling signal Skip_Mode, the current judging signal Skip, the zero judging signal ZCDOUT, and a controlling signal GATE so as to decide whether no inductor current IL lasts over a first predetermined period or not. If so, the noise-avoiding signal OVER-CYCLE is generated. As the noise-avoiding signal OVER-CYCLE is generated, the turn-on period controlling unit 300 receives the reset signal POR, the skip-mode controlling signal Skip_Mode, the current judging signal Skip, and the noise-avoiding signal OVER-CYCLE, and generates at least one turn-on period controlling signal N1~NN. The pulse generating unit 400 is a constant-on-time pulse generating unit, which decides the predetermined constant on-time based on the received output voltage Vout and input voltage Vin. However, as the noise-avoiding signal OVER-CYCLE is generated, the pulse generating unit 400 would adjust the above mentioned constant on-time based on at least one on-time controlling signal N1~NN. The pulse generating unit 400 also receives the voltage feedback signal FB, and generates a pulse controlling signal Con as the voltage feedback signal FB is high. The driving unit 600 receives the controlling signal Con to generate a controlling signal GATE to drive the first switching unit Q1.

Figure 4A:
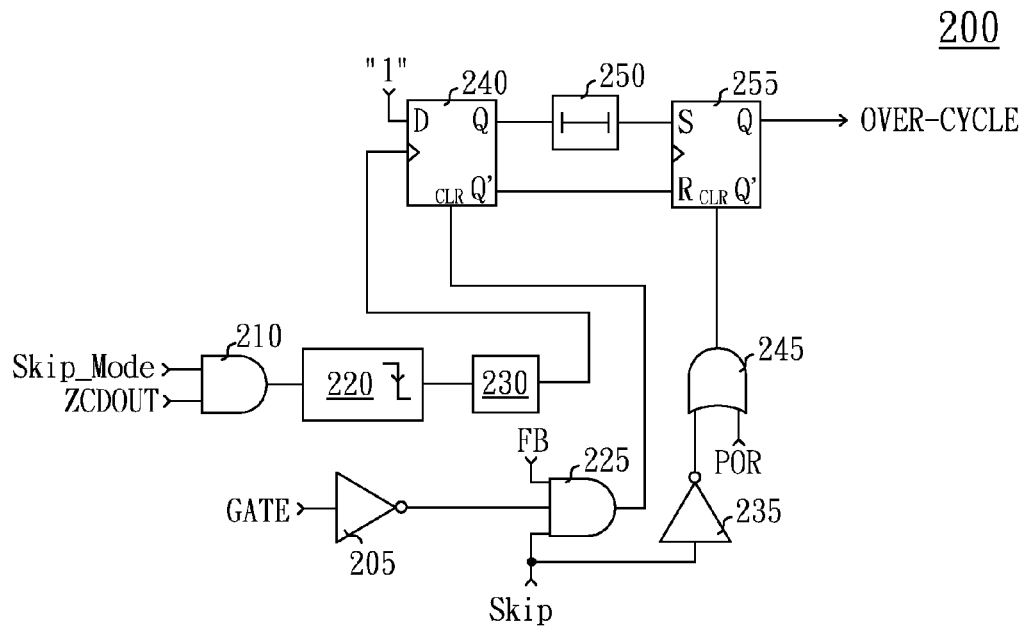
FIG. 4A is a schematic circuit diagram of an operating frequency detecting unit in the preferred embodiment shown in FIG. 3A.

FIGS. 4A, 5, 6A, and 7A are schematic circuit diagrams of the preferred embodiments of the operating period detecting unit 200, the turn-on period controlling unit 300, the pulse generating unit 400, and the skip-mode judging unit 500 shown in FIG. 3A. Referring to FIG. 4A, the operating period detecting unit 200 has an inverter 235, AND gates 210 and 225, a falling edge trigger unit 220, a trigger delay unit 230, a D latch 240, a OR gate 245, a delay circuit 250, and a SR latch 255.

Please also referring to FIG. 3A, right after the DC-to-DC converting circuit entering the skip mode, which is also regarded as entering the discontinuous current mode, the first switching unit Q1 is turned off due to the controlling signal GATE being low. Meanwhile, the inductor current IL is reduced to zero so that the zero judging signal ZCDOUT is generated (i.e.: becomes low from high) and the current judging signal Skip become high to start judgment for noise-avoiding function. In addition, the output voltage Vout is still maintained above the predetermined voltage level to generate the low level voltage feedback signal FB. At this time, the operating period detecting unit 200 is still waiting. When the energy stored in the capacitor C of the DC-to-DC converting circuit gradually releases to the load, the voltage level of the output voltage Vout falls below the predetermined voltage level and the voltage feedback signal FB becomes high. Meanwhile, the inverter 205 inverts the low level controlling signal GATE into a high level output, and the AND gate 225 receives the output of the inverter 205, the voltage feedback signal FB, and the current judging signal Skip. Since the three signals are all high, the AND gate 225 outputs a high level signal to clear the D latch 240. In addition, the AND gate 210 receives the skip-mode controlling signal Skip_Mode and the zero judging signal ZCDOUT. Since the skip-mode controlling signal Skip_Mode is high, which represents that the skip-mode is activated, and the zero judging signal ZCDOUT is high, the AND gate 210 outputs a high level signal to the falling edge trigger unit 220 and the trigger delay unit 230. When the voltage level of the output voltage Vout falls below the predetermined voltage level, the controlling signal GATE becomes high to turn on the first switching unit Q1 for transmitting power of the input voltage Vin to the capacitor C. The inverter 205 inverts the high level controlling signal GATE into a low level signal, and the AND gate 225 receives the low level signal and outputs a low level signal to stop clearing the D latch 240. Since the DC-to-DC converting circuit operates under discontinuous current mode, the inductor current IL will be zero and so the zero judging signal ZCDOUT becomes low and then the output of the AND gate 210 also becomes low. The output signal from the AND gate 210 is delayed by the trigger delay unit 230 so as to have the D latch 240 being triggered after the controlling signal GATE becoming high. Thus, when the clear input of the D latch 240 becomes low, the trigger delay unit 230 still outputs the high level signal to have the D latch stores the signal at the D input. Because the signal at the D input is fixed high, the Q output of the D latch 240 may output a high level signal and the Q' output of the D latch 240 output a low level signal. The delay circuit 250 receives the high level signal from the Q output of the D latch 240 and outputs a high level signal when the received high level signal lasts for a predetermined period. The predetermined period is used for judging whether the DC-to-DC converting circuit generates the audible noise, which is preferred to be equal to or shorter than 50 us. As the output voltage Vout remains high over the predetermined period, the output signal of the AND gate 225 becomes low and the D latch 240 keeps outputting the high level signal at the Q output over the predetermined period. Thereby, the delay circuit 250 outputs a high level signal. The SR latch 255 receives the high level signal at the S input and outputs a high level noise-avoiding signal OVER-CYCLE to turn on the noise avoiding unit Q3 for releasing the energy stored in the capacitor C to the inductor L.

According to the above mentioned procedure, the current-less period of the inductor L is shorter than human hearing range so as to achieve the object of reducing audible noise. In addition, as the output voltage Vout is lower than the predetermined voltage level due to the energy discharging of the noise avoiding unit Q3, the voltage feedback signal FB becomes high and the AND gate 225 outputs a high level signal to clear the D latch 240. At this time, the Q' output of the D latch 240 is high to reset the SR latch 255 to turn off the noise avoiding unit Q3. The current judging signal Skip is inverted by the inverter 235 and then received by the OR gate 245 to do logic computation with the reset signal POR. The output of the SR latch 255 would be clear to stop generating the noise-avoiding signal OVER-CYCLE when the reset signal POR is high or the current judging signal Skip is low. The reset signal POR is high when the controller being started, and the current judging signal Skip is low when the controller leaving the skip mode.

As mentioned, when the DC-to-DC converting circuit entering the skip mode, the operating period detecting unit 200 detects if the inductor current IL is zero. As the inductor current IL is zero and lasts over the predetermined period, the operating period detecting unit 200 forces the inductor L to store energy by releasing the energy stored in the capacitor C so as to achieve the object for reducing audible noise.

Figure 5:
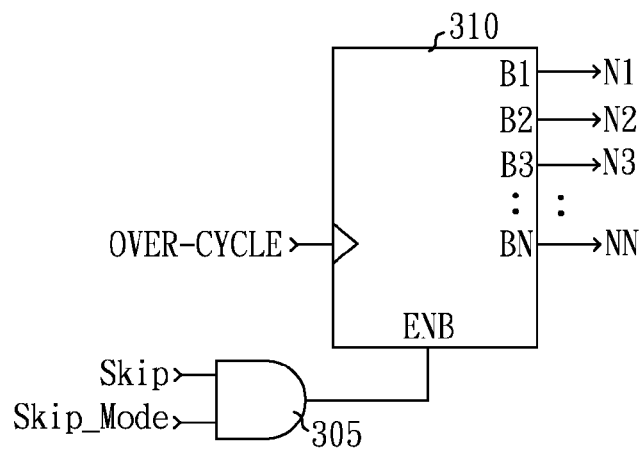
FIG. 5 is a schematic circuit diagram of a turn-on period controlling unit of a preferred embodiment according to the present invention.

Referring to FIG. 5, the turn-on period controlling unit 300 has an AND gate 305 and a counter 310. When the skip mode controlling signal Skip_mode and the current judging signal Skip are high, the AND gate 305 generates a high level signal to an enable input ENB of the counter 310 to start the counter 310. After started, the counter 310 counts the number of received noise-avoiding signals OVER-CYCLE. The existing of the noise-avoiding signal OVER-CYCLE implies that the voltage level of the output voltage Vout greater than the predetermined voltage level to result zero or reversed inductor current IL lasts over the predetermined period. That is, on-time of the first switching unit Q1 in the previous period is too long so that the capacitor C stores too much energy.

For example, as the number of the noise-avoiding signals received by the counter 310 is m, the counter 310 outputs high level on-time controlling signal N1~Nm and low level on-time controlling signal Nm+1~NN from the output B1~BN. Attending with the increasing number of the received noise-avoiding signals OVER-CYCLE, the amount of the high level on-time controlling signal is increased to reduce width of the controlling signal GATE. Thus, on-time of the first switching unit Q1 is reduced. When the DC-to-DC converting circuit escapes the skip mode, a low level current judging signal Skip is generated to stop the counter 310 and resets all the on-time controlling signal N1~NN to low level.

Figure 6A:
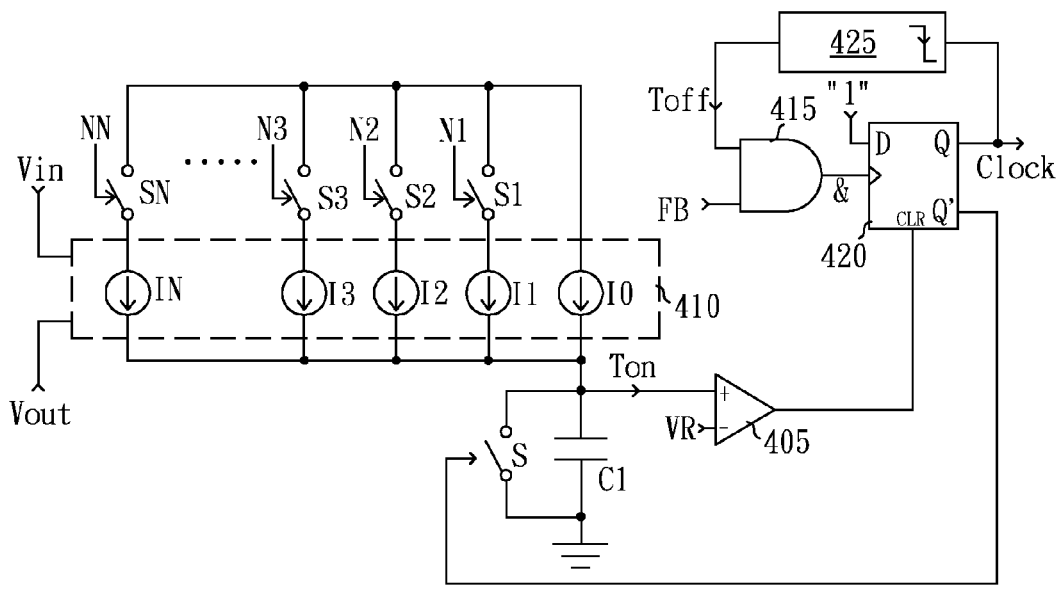
FIG. 6A is a schematic circuit diagram of a pulse generating unit in the preferred embodiment shown in FIG. 3A.

FIG. 6A is a schematic circuit diagram of the pulse generating unit 400 of FIG. 3A. As shown, the pulse generating unit 400 has switches S and S1~Sn, a charging capacitor C1, a comparator 405, a current source 410, an AND gate 415, a D latch 420, and a falling edge trigger unit 425. The current source 410 has a plurality of current units I0~IN, which provides current according to the input voltage Vin and the output voltage Vout. That is, a higher input voltage Vin results in a greater current, and a higher output voltage Vout results in a smaller current. The current among the current units I0~IN may have a predetermined relationship, such as:

$$I0:I1:I2\ldots Im\ldots IN=1:2:4\ldots 2^m\ldots 2^N$$

When the DC-to-DC converting circuit is under normal operation and does not enter skip mode, all the on-time controlling signals N1~NN are low. Meanwhile, only the current unit I0 in the current source 410 is used to charge the charging capacitor C1 for generating a turn-on reference signal Ton. The comparator 405 receives the turn-on reference signal Ton and a reference voltage level VR. When the voltage level of the turn-on reference signal Ton is higher than the reference voltage level VR, a high level signal is outputted to clear the D latch 420. At this time, the Q' output of the D latch 420 outputs a high level signal to turn on the switch S so that the voltage level crossing the charging capacitor C1 drops to zero. The falling edge trigger unit 425 detects the voltage variation of the Q output of the D latch 420 and generate an off-time signal Toff to the AND gate 415. As the output signal of the Q output of the D latch 420 drops from high level to low level, the falling edge trigger unit 425 detects the falling edge of such variation to stop generating high level off-time signal Toff for a predetermined period. That is, the off-time signal Toff is low in the present period. The AND gate 415 receives the voltage feedback signal FB and the off-time signal Toff. When the output voltage Vout is decreased below the predetermined voltage level and the off-time signal Toff is high, the AND gate 415 will output a high level turn-on signal & to trigger the D latch 420 to detect the signal at the D input, which is always high. Thereby, the D latch 420 will output a pulse signal Clock once the AND gate 415 outputs the high level turn-on signal &.

While the D latch 420 outputs the pulse signal Clock, the Q' output of the D latch 420 outputs a low level signal to cut off the switch S. Meanwhile, the current source 410 begins to recharge the charging capacitor C1 until the voltage level of the turn-on reference signal Ton reaches the reference voltage level VR to reset the D latch 420 to stop the pulse signal Clock. The time length needed for the voltage level of the turn-on reference signal Ton rising to the reference voltage level VR is VR*C1/I, wherein I is the current value provided by the current source 410. Under normal operation, only the current from the current unit I0 of the current source 410 is provided to result in a pulse signal Clock with a constant width. However, when the noise-avoiding signal OVER-CYCLE begins, the switches S1~SN would be turned on by the turn-on period controlling unit 300 according to the amount of the generated noise-avoiding signals OVER-CYCLE. Thus, the total current provided by current units I1~IN in the current source 410 utilized is increased so that the time needed for the turn-on reference signal Ton to reach the reference voltage level VR would be gradually reduced to decrease the pulse width of the pulse signal Clock until the noise-avoiding signal OVER-CYCLE disappears. That is, when skip mode is activated and the zero inductor current lasts over the predetermined period, the controller in the present invention begins to decrease the pulse width of the controlling signal Q1 until the resulted zero inductor current would not last over the predetermined period.

Figure 7A:
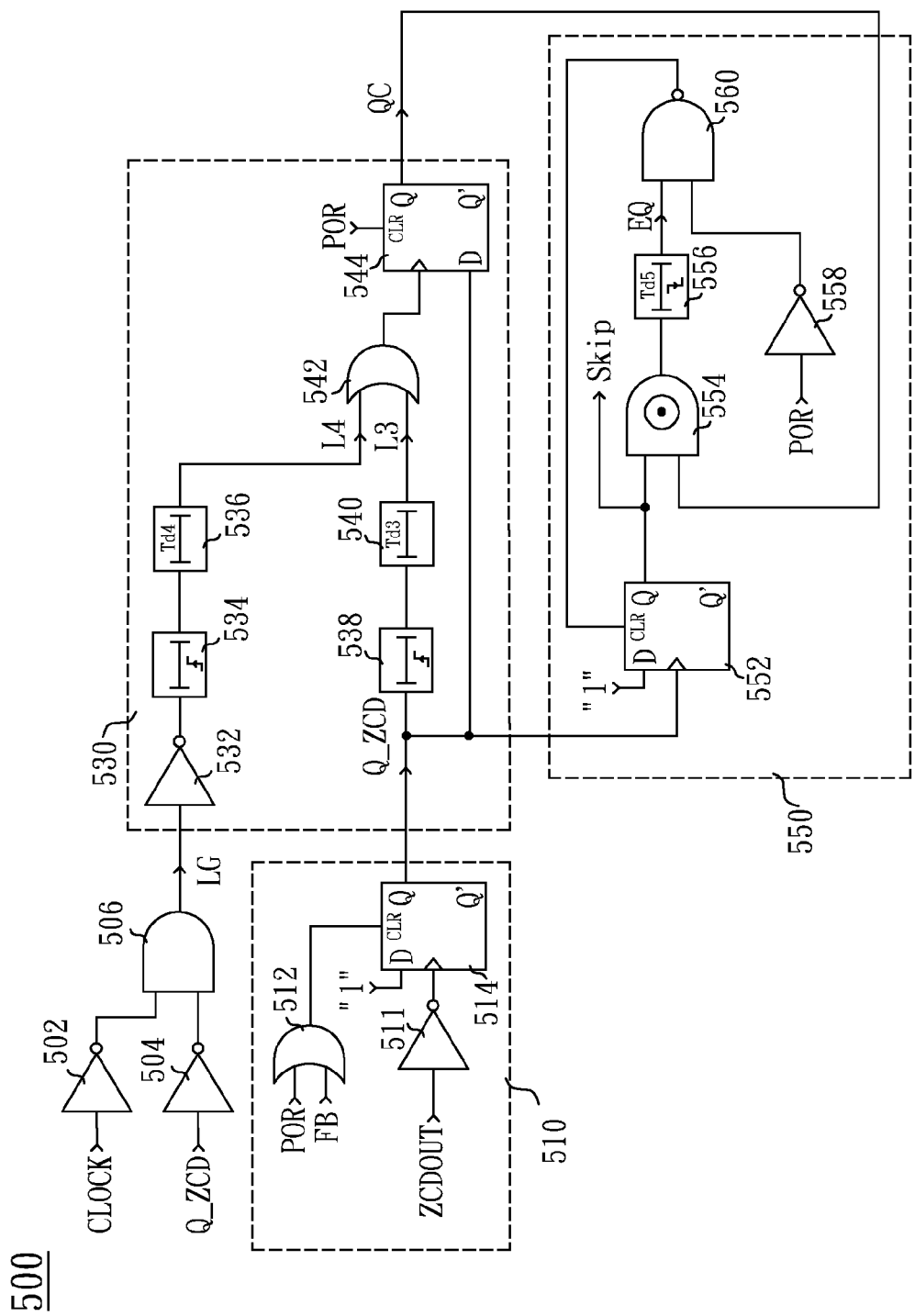
FIG. 7A is a schematic circuit diagram of a pulse-skipping judging unit in the preferred embodiment shown in FIG. 3A.

Referring to FIG. 7A, the skip-mode judging unit 500 has inverters 502 and 504, an AND gate 506, a signal generating unit 510, a signal maintaining unit 530, and a signal comparing unit 550. The inverters 502 and 504 receive the pulse signal Clock and a latch reset signal Q_ZCD from the signal generating unit 510 respectively. The AND gate 506 receives the output signals from the inverters 502 and 504 and executes logic calculation to output an inverted current judging signal LG. As the pulse signal Clock is low to turn off the first switching unit Q1 and the inductor current IL continues via the second synchronous diode D2, the latch reset signal Q_ZCD would be low and the AND gate 506 would output a high inverted current judging signal LG. The signal generating unit 510 has an inverter 511, an OR gate 512 and a D latch 514 for detecting the zero judging signal ZCDOUT. The OR gate 512 receives the reset signal POR and the voltage feedback signal FB and clears the D latch 514 as the system is started or the output voltage Vout is decreased below the predetermined voltage level. When the zero judging signal ZCDOUT is low representing that the inductor current IL is zero, the D latch 514 is triggered to detect the signal at the D input thereof so that the signal generating unit 510 outputs a high level latch reset signal Q_ZCD. The high level latch reset signal Q_ZCD is stopped as the output voltage Vout is increased over the predetermined voltage level.

The signal maintaining unit 530 has an inverter 532, rising edge trigger units 534 and 538, delay units 536 and 540, an OR gate 542, and a D latch 544. The signal maintaining unit 530 outputs a high level maintaining signal QC when the zero judging signal ZCDOUT is generated. The signal maintaining unit 530 also judges whether there is a zero judging signal ZCDOUT generated in each operating period or not. If so, the maintaining signal QC remains. The D latch 544 is reset by the reset signal POR as the system is started. The latch reset signal Q_ZCD from the signal generating unit 510 is calculated by the rising edge trigger unit 538 and the delay unit 540 to generate a first recognizing signal L3, which is utilized for generating and keeping the maintaining signal QC. The inverted current judging signal LG is calculated by the inverter 532, the rising edge trigger unit 534, and the delay unit 536 to generate a second recognizing unit L4, which is utilized for triggering the D latch 544 to detect the latch reset signal Q_ZCD at the D input so as to output the maintaining signal QC. Thus, after the low level latch reset signal Q_ZCD is transformed into a high level one for a predetermined period Td3, the D latch 544 outputs a high level maintaining signal QC. When the DC-to-DC converting circuit is operated at continuous current mode in a certain operation period, there is no zero judging signal ZCDOUT being generated. At this time, as the output voltage Vout is reduced below the predetermined voltage level, the voltage feedback signal FB would be high to clear the D latch 514 so that the latch reset signal Q_ZCD is stopped. Meanwhile, the pulse signal Clock is generated to turn the high level inverted current judging signal LG into a low level one. The low level inverted current signal LG is then inverted by the inverter 532 to trigger the rising edge trigger unit 534. The output of the rising edge trigger unit 534 is delayed by the delay unit 536 for a predetermined period Td4 and then the second recognizing signal L4 is generated to trigger the D latch 544 to detect the latch reset signal Q_ZCD. At this time, since the latch reset signal Q_ZCD is low, the D latch 544 outputs a low level maintaining signal QC. It is noted that because the first recognizing signal L3 and the second recognizing signal L4 are utilized for establishing and stopping the high level maintaining signal QC, the predetermined period Td3 must be shorter than the predetermined period Td4.

The signal comparing unit 550 has a D latch 552, a XNOR gate 554, a falling edge delay unit 556, an inverter 558, and a NAND gate 560. The signal comparing unit 550 is utilized for comparing the current judging signal Skip and the maintaining signal QC so as to determine whether the condition of the current judging signal Skip should be varied. The default value of the Q output of the D latch 552 is low to generate a low current judging signal Skip in the beginning. The inverter 558 receives the reset signal POR and outputs a low level signal for resetting the D latch 552 through the NAND gate 560 right after the system is started. Then, the output signal of the inverter 558 turns into a high level signal. Therefore, after the system is completely started, the output signal of the NAND gate 560 for resetting the D latch 552 is only decided by the inverted eliminating signal EQ from the XNOR gate 554. As the DC-to-DC converting circuit is under normal operation, the zero judging signal ZCDOUT is low so that the maintaining signal QC is low to have the XNOR gate 554 output a high level signal. The falling edge delay unit 556 receives the high level signal and outputs a high level inverted eliminating signal EQ to the NAND gate 560. As the inductor current IR is zero, the zero judging signal ZCDOUT becomes low. Thereby, the signal generating unit 510 outputs a high level latch reset signal Q_ZCD and the signal maintaining unit 530 waits for a time period Td3 and then outputs a high level maintaining signal QC. At this time, the D latch 552 is triggered by the latch reset signal Q_ZCD to output a high level current judging signal Skip. Before the maintaining signal QC is transformed into a high level signal, the XNOR gate compares the high level current judge signal Skip and the low level maintaining signal QC and outputs a low level signal. The low level signal is then delayed by the falling edge delay unit 556 for a time period Td5. Since the time period Td5 is set to be longer than the time period Td4, the maintaining signal QC is transformed into a high level signal before the inverted eliminating signal EQ is outputted by the falling edge delay unit 556 so as to prevent the D latch 552 from being improperly reset. When the DC-to-DC converting circuit is transformed from discontinuous current mode into continuous current mode, the signal maintaining unit 530 stops outputting the high level maintain signal QC. At this time, the XNOR gate 554 compares the high level current judging signal Skip and the low level maintaining signal QC and outputs a low level signal. The low level signal is delayed by the falling edge delay unit 556, and then a low level inverted eliminating signal EQ is generated to reset the D latch 552 and turn the high level current judging signal Skip into a low level signal.

Therefore, as the inductor current IL falls to zero to generate a low level zero judging signal ZCDOUT, the skip-mode judging unit 500 may output a high level current judging signal Skip immediately. In addition, the skip-mode judging unit 500 monitors if there is any zero judging signal ZCDOUT generated in the following operating periods. The current judging signal Skip is stopped until there is no zero judging signal ZCDOUT in the present operating period.

Figure 3B:
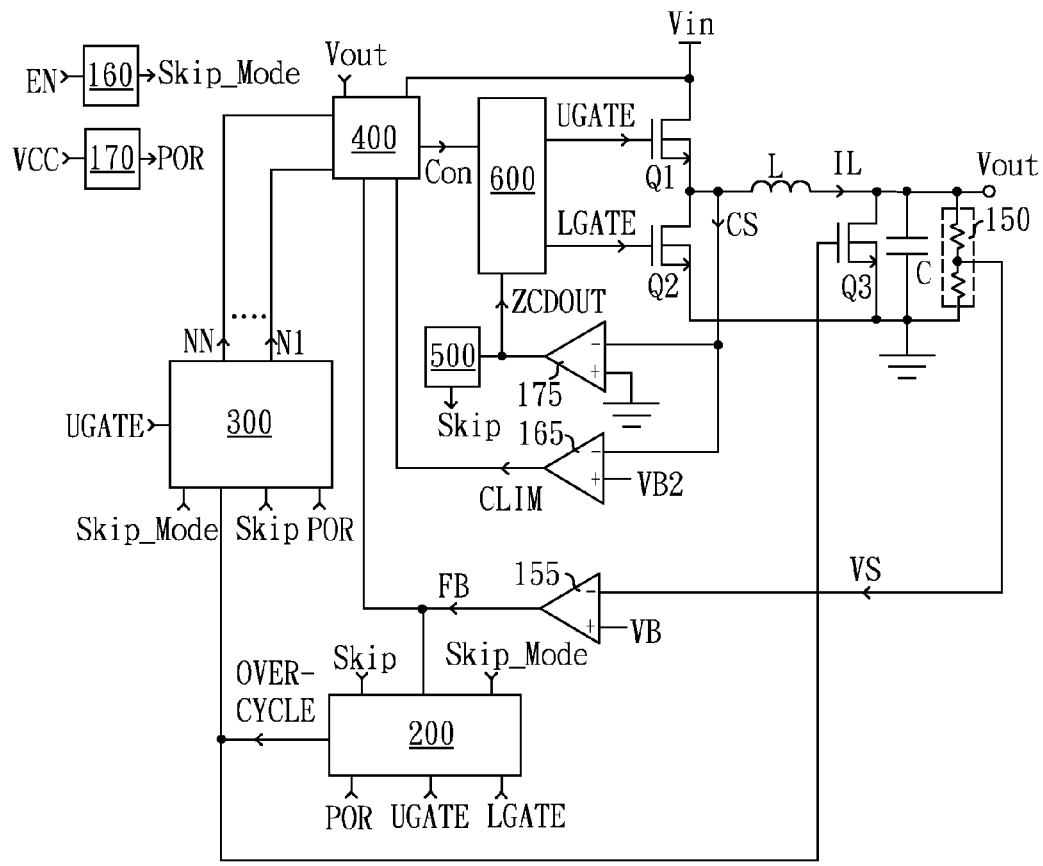
FIG. 3B is a schematic circuit diagram of the DC-DC converting circuit for reducing audible noise corresponding to the embodiment shown in FIG. 2B.

FIG. 3B is a circuit diagram of the DC-to-DC converting circuit for reducing audible noise according to the embodiment as shown in FIG. 2B. Most of the circuit provided in FIG. 3B is similar to that of FIG. 3A. Therefore, only the difference between the two embodiments is described below for a better understanding of the scope of the present invention.

Figure 6B:
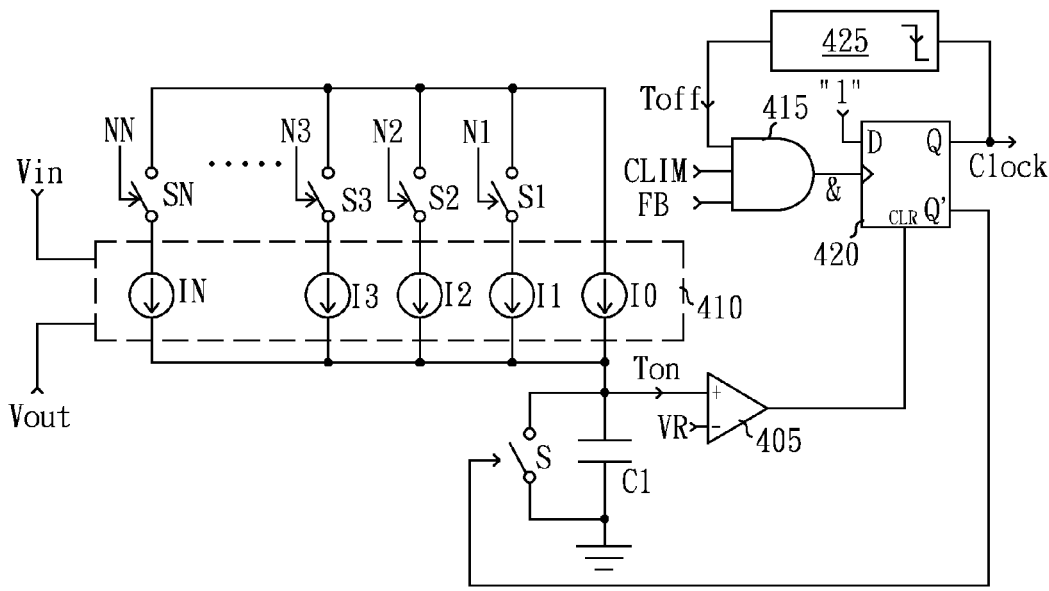
FIG. 6B is a schematic circuit diagram of a pulse generating unit in the preferred embodiment shown in FIG. 3B.

In the present embodiment as shown in FIG. 3B, a current limiting comparator 165 is added, which has a non-inverting terminal receiving a current reference voltage level VB2 and an inverting terminal receiving the current detecting signal CS. When the voltage level of the current detecting signal CS is smaller than the current reference voltage level VB2, the current limiting comparator 165 outputs a high level current limit judging signal CLIM to the AND gate 415 of the pulse generating unit 400 as shown in FIG. 6B. Meanwhile, as the voltage level of the output voltage Vout is lower than the predetermined voltage level and a fixed time period after the previous turn-on of the first switching unit Q1 has passed by, a high level voltage feedback signal FB and a high level off-time signal Toff are generated to have the AND gate 415 output a high level signal to turn on the first switching unit Q1. The fixed time period is set by the falling edge trigger unit 425 to provide enough time for the inductor L to release energy to the capacitor C. Thereby, the first switching unit Q1 would be turned on to store energy to the inductor L as the inductor current IL is reduced below a predetermined current value so that a higher power transmitting rate can be achieved. In addition, since the on-time of the first switching unit Q1 is fixed, the maximum value of the inductor current IL is restricted by the predetermined current value so as to prevent the first switching unit Q1 and the inductor L from being damaged by an unpredictable huge current.

Figure 4B:
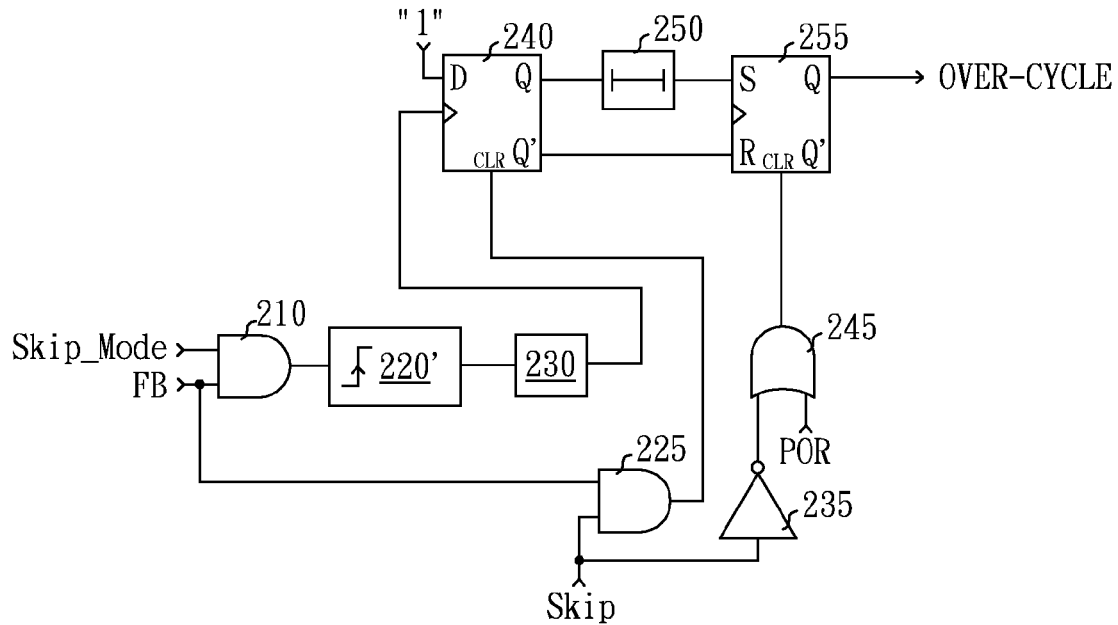
FIG. 4B is a schematic circuit diagram of an operating frequency detecting unit in the preferred embodiment shown in FIG. 3B.

FIG. 4B is a circuit diagram showing a preferred embodiment of the operating period detecting unit in FIG. 3B. In the present embodiment, the operating period detecting unit 200 judges whether the audible noise would be generated or not by comparing the time interval of the generated voltage feedback signals FB with the predetermined period. In practice, the comparison can be executed by using the first controlling signal UGATE to replace the voltage feedback signal FB. As shown, the AND gate 210 receives the skip-mode controlling signal Skip_Mode and the voltage feedback signal FB. The output signal of the AND gate 210 is operated by the rising edge trigger unit 220' and the trigger delay unit 230 to trigger the D latch 240 to detect the signal at the D input. As the DC-to-Dc converting circuit is under normal operation, the current judging signal Skip is at a low level to clear the SR latch 255. At this time, the SR latch 255 would not generate the noise-avoiding signal OVER-CYCLE. As the DC-to-DC converting circuit is operated under skip mode, the current judging signal Skip is at a high level. At this time, as the time interval of the voltage feedback signals FB exceeds the predetermined period, the SR latch 255 would generate the noise avoiding signal OVER-CYCLE. In the present embodiment, the rising edge trigger unit 220' is utilized for detecting the voltage feedback signal FB. That is, the starting point of the voltage feedback signal FB is detected. However, the ending point of the voltage feedback signal FB or the combination of the starting and ending points of the voltage feedback signal FB can be adopted in the present invention without affecting the function of the present invention because the operating frequency of the controller is much greater than human hearing range, and a difference of one or two operating periods is neglectable.

Figure 7B:
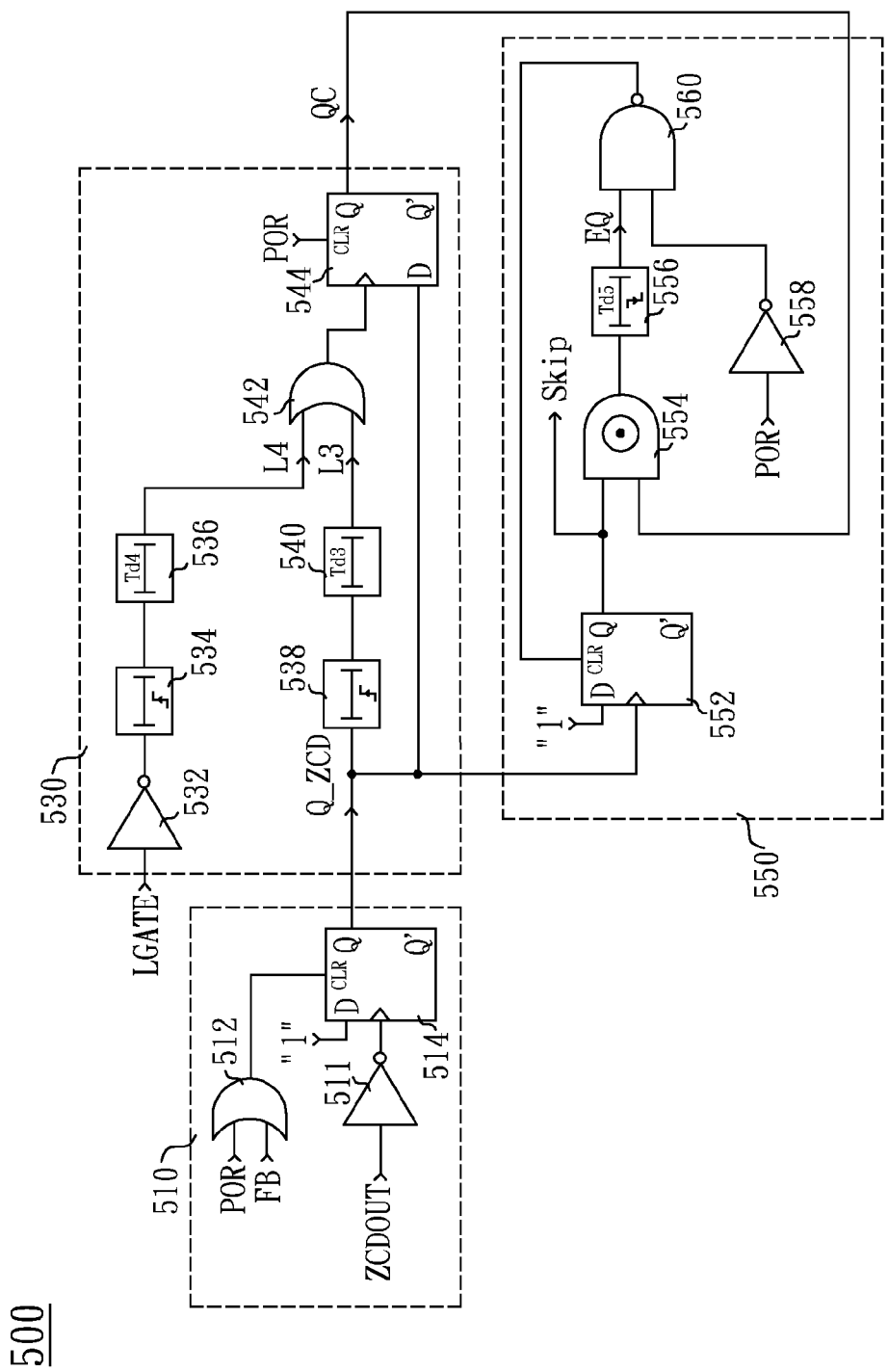
FIG. 7B is a schematic circuit diagram of a pulse-skipping judging unit in the preferred embodiment shown in FIG. 3B.

FIG. 7B is a circuit diagram showing the skip-mode judging unit of FIG. 3B according to a preferred embodiment in the present invention. The difference between the present embodiment and the embodiment of FIG. 7A only lies in that the inverted current judging signal LG is replaced by the second controlling signal LGATE. Therefore, the operation of the present embodiment can be understood by the description of the embodiment of FIG. 7A. In addition, the turn-on period controlling unit 300 shown in FIG. 5 is common to the embodiments shown in FIG. 3B and FIG. 3A.

Figure 8:
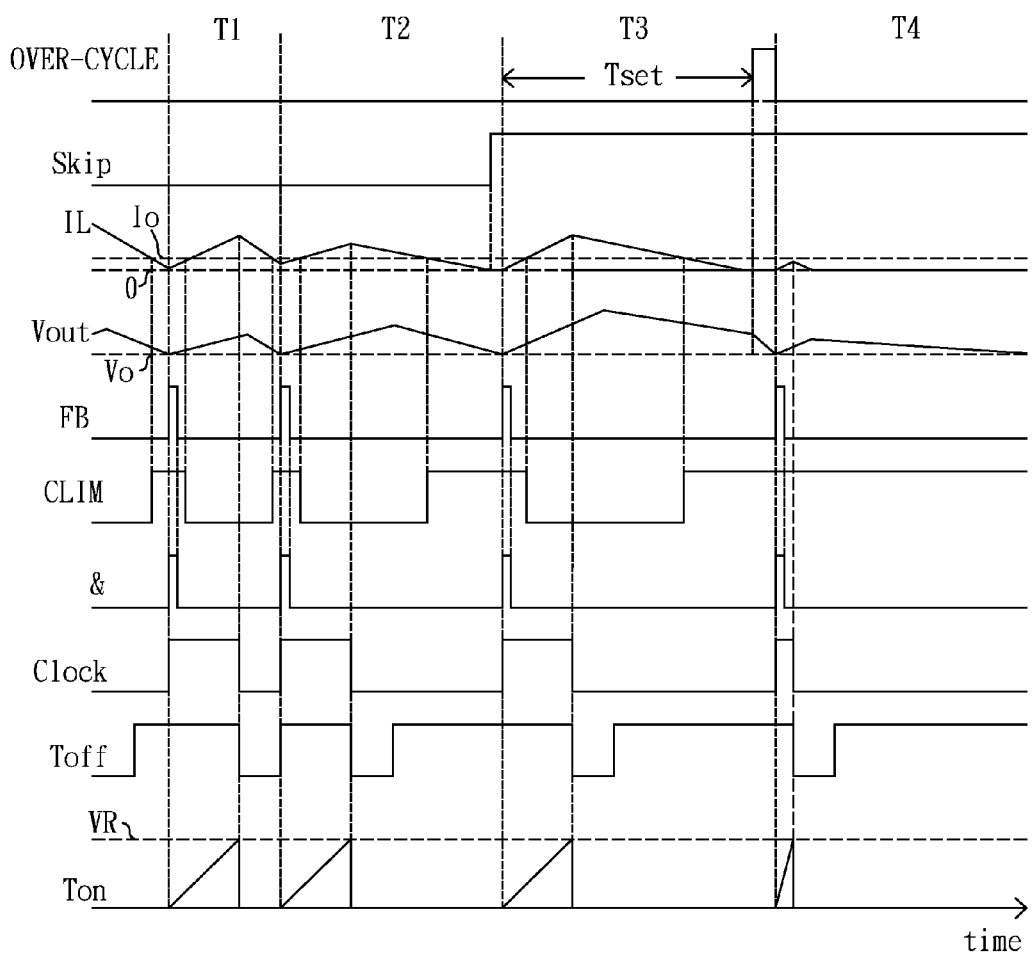
FIG. 8 is a timing diagram of signals of the embodiment shown in FIG. 3B.

FIG. 8 is a timing diagram showing the waveform of the signals generated on the circuit of FIG. 3B. Please also referring to FIG. 3B, as the inductor current IL is lower than the predetermined current limit value Io, which is represented by the current reference voltage level VB2, the current limit comparator 165 outputs a high level current limit judging signal CLIM. As shown in FIG. 8, the output voltage Vout decreases attending with the decreasing of the inductor current IL. When the output voltage Vout is decreased below the predetermined voltage level Vo, the feedback detecting unit 155 outputs the high level voltage feedback signal FB and the first operating period T1 begins. Also referring to FIG. 6B, at this time, the off time signal Toff, the current limit judging signal CLIM, and the voltage feedback signal FB are all high to have the AND gate 415 output a high level turn-on signal & so that the D latch 420 is triggered and begins to generate a high level pulse signal Clock to turn off the switch S. Meanwhile, the charge capacitor C1 being to be charged and the voltage level of the turn-on reference signal Ton begins to rise. Afterward, when the output voltage Vout is higher than the predetermined voltage level Vo, the voltage feedback signal FB becomes low, and when the inductor current IL is higher than the predetermined current limit value Io, the current limit judging signal CLIM becomes low. Moreover, when the turn-on reference signal Ton reaches the reference voltage VR, the comparator 405 outputs the high level signal to clear the D latch 420 so that the D latch 420 stops outputting the pulse signal Clock and the falling edge trigger unit 425 stops outputting the turn off signal Toff for a predetermined period. At this time, because the first switching unit Q1 is turned off, the inductor current IL begins to decline and the output voltage Vout follows. As the inductor current IL reaches the predetermined current limit value Io, the current limit judge signal CLIM becomes high again. Meanwhile, when the output voltage Vout is decreased below the predetermined voltage level Vo, the voltage feedback signal FB becomes high.

Afterward, if the load is lighter in the second period T2, the time needed for the output voltage Vout returns to the predetermined voltage level Vo is longer. That is, the second period T2 is longer than the first period T1 and the inductor current IL may be reduced to zero. As the inductor current IL becomes zero, the skip-mode judging unit 500 outputs the high level current judging signal Skip and detects if the zero judging signal ZCDOUT is generated in the following operating periods. The skip-mode judging unit 500 stops outputting the current judging signal Skip until there is a certain operating period with no zero judging signal ZCDOUT.

Then, in the third period T3, the converting circuit is still light loaded. The is voltage level of the output voltage Vout is kept above the predetermined voltage level Vo to result in the low level voltage feedback signal FB lasting over the predetermined period. At this time, referring to FIG. 4B, the SR latch 255 may output a high level noise-avoiding signal OVER-CYCLE to turn on the noise avoiding unit Q3 so that the capacitor C discharges the stored energy through the noise avoiding unit Q3 to have the output voltage Vout decreased below the predetermined voltage level Vo again. Then, the voltage feedback signal FB becomes high to stop the output of the noise-avoiding signal OVER-CYCLE and enters the fourth period T4. In the fourth period T4, the converting circuit is still light loaded. The D latch 240 outputs the pulse signal Clock once again to turn on the first switching unit Q1 and recharges the capacitor C. Also referring to FIG. 5, because the counter 310 has detected the noise-avoiding signal OVER-CYCLE at the end of the third period T3, the high level on-time controlling signal N1 is generated so that the current unit I1 of the current source 410 begins to charge the charge capacitor C1. Therefore, the time needed for the turn-on reference signal Ton reaching the reference voltage level VR is shortened to result in a narrower pulse signal with smaller energy being transmitted.

The noise avoiding unit Q3 in the above mentioned embodiments is described as an outer component. However, the present invention should not be so limited. In practice, the noise avoiding unit Q3 may be embedded in the controller for reducing the audible noise.

As described above, the present invention completely fulfills the three requirements on patent application: innovation, advancement and industrial usability. In the aforementioned texts the present invention has been disclosed by means of preferred embodiments thereof; however, those skilled in the art can appreciate that these embodiments are simply for the illustration of the present invention, but not to be interpreted as for limiting the scope of the present invention. It is noted that all effectively equivalent changes or modifications on these embodiments should be deemed as encompassed by the scope of the present invention. Therefore, the scope of the present invention to be legally protected should be delineated by the subsequent claims.

What is claimed is:

1. A converting circuit, comprising:
   a converting module for converting an input voltage into an output voltage, comprising a first switching unit, a energy storage unit, an energy-releasing unit, and a capacitance unit, wherein the first switching unit is coupled between the input voltage and the energy storage unit, the energy-releasing unit is coupled to the energy storage unit for releasing a stored energy of the energy storage unit when the first switching unit is turned off, and one end of the capacitance unit is coupled to the energy storage unit to provide the output voltage to a load;
   a controller, generating a first controlling signal to control the first switching unit according to a current detecting signal indicative of a current through the energy storage unit and a voltage detecting signal indicative of the output voltage; and
   a discharging circuit, coupled to the capacitance unit, for discharging a stored energy of the capacitance unit.

2. The converting circuit according to claim 1, wherein the discharging circuit at least comprises one resistor continuously discharging the stored energy of the capacitance unit to have a signal generating frequency of the first controlling signal being greater than human hearing range.

3. The converting circuit according to claim 1, wherein the discharging circuit comprises a voltage dividing circuit coupled to the capacitance unit for generating the voltage detecting signal, and the voltage dividing circuit continuously discharges the stored energy of the capacitance unit to have a signal generating frequency of the first controlling signal being greater than human hearing range.

4. The converting circuit according to claim 1, wherein the controller generates a noise-avoiding signal for controlling the discharging circuit to discharge the stored energy of the capacitance unit when the current smaller than a predetermined current value lasts over a first predetermined period.

5. The converting circuit according to claim 4, wherein the energy-releasing unit is a transistor, one end of the transistor is coupled to the first switching unit, and the other end thereof is grounded.

6. The converting circuit according to claim 5, wherein the controller comprises:
   a first detecting unit, generating a voltage feedback signal according to the voltage detecting signal;
   a second detecting unit, generating a current judging signal according to the current detecting signal;
   a period judging unit, generating the noise-avoiding signal when the current smaller than the predetermined current value lasts over the first predetermined period; and
   a driving unit, receiving the voltage feedback signal and the current judging signal to generate the first controlling signal for controlling the first switching unit and a second controlling signal for controlling the transistor.

7. The converting circuit according to claim 4, wherein the discharging circuit has the energy storage unit coupled with a reference voltage level for a second predetermined period according to the noise-avoiding signal to have the stored energy of the capacitance unit being discharged.

8. The converting circuit according to claim 6, wherein the driving unit comprises a turn-on period controlling unit for controlling a pulse width of the first controlling signal.

9. The converting circuit according to claim 8, wherein the turn-on period controlling unit adjusts the pulse width of the first controlling signal based on the amount of the noise-avoiding signals being generated.

10. The converting circuit according to claim 9, wherein the discharging circuit is coupled to the capacitance unit and controlled by the noise-avoiding signal to discharge the stored energy of the capacitance unit to have the output voltage being lower than a predetermined voltage.

11. The converting circuit according to claim 6, wherein the noise-avoiding signal controls the discharging circuit to transmit the stored energy of the capacitance unit to the energy storage unit.

12. The converting circuit according to claim 1, wherein the controller determines whether to generate a noise-avoiding signal to control the discharging circuit to discharge the stored energy of the capacitance unit or not according to the first predetermined period and a time interval that the first switching unit being turned on.

13. The converting circuit according to claim 12, wherein the time interval is determined according to the beginning time when the first switching unit is turned on, the ending time when the first switching unit is turned on, or the combination thereof.

14. The converting circuit according to claim 13, wherein the controller comprises:
- a first detecting unit, generating a voltage feedback signal according to the voltage detecting signal;
- a second detecting unit, generating a current judging signal according to the current detecting signal;
- a period judging unit, generating the noise-avoiding signal when the time interval that the first switching unit being turned on is longer than the first predetermined period; and
- a driving unit, receiving the voltage feedback signal and the current judging signal and accordingly generating the first controlling signal for controlling the first switching unit and a second controlling signal for controlling the energy-releasing unit.

15. The converting circuit according to claim 14, wherein the driving unit comprises a turn-on period controlling unit for controlling a pulse width of the first controlling signal.

16. The converting circuit according to claim 15, wherein the turn-on period controlling unit adjusts the pulse width of the first controlling signal based on the amount of the noise-avoiding signals being generated.

17. The converting circuit according to claim 16, wherein the discharging circuit is coupled to the capacitance unit and controlled by the noise-avoiding signal to discharge the stored energy of the capacitance unit to have the output voltage being lower than a predetermined voltage.

18. The converting circuit according to claim 14, wherein the noise-avoiding signal controls the discharging circuit to transmit the stored energy of the capacitance unit to the energy storage unit.

19. A converting controller for controlling a converting module to convert an input voltage into an output voltage, comprising:
- a first detecting unit, generating a voltage feedback signal according to the output voltage;
- a second detecting unit, generating a current judging signal according to a current of the converting module; and
- a driving unit, receiving the voltage feedback signal and the current judging signal and accordingly generating a controlling signal for controlling the converting module to have the output voltage larger than a predetermined voltage;
- wherein, the first detecting unit is coupled to a capacitance unit of the converting module and continuously discharges a stored energy of the capacitance unit to have a signal generating frequency that the controlling signal being generated by the controller is greater than human hearing range.

20. The converting controller according to claim 19, wherein the second detecting unit comprises a zero crossing comparator for generating the current judging signal according to the current of the converting module and a zero reference level.

21. The converting controller according to claim 19, wherein the second detecting unit further comprises a current limiting comparator for generating a current limiting judging signal according to the current of the converting module and a current limiting reference level.

22. The converting controller according to claim 21, wherein the driving unit further receives the current limiting judging signal and accordingly determines whether to generate the controlling signal or not.

23. The converting controller according to claim 19, wherein the first detecting unit comprises a feedback detecting unit for generating the voltage feedback signal according to the output voltage and a voltage reference level.

24. A method for reducing audible noise of a converting module, comprising the steps of:
- determining a discharging resistance value according to a predetermined output voltage, a predetermined period limit, and a minimum energy transmitted in an operating period by the converting module, which is controlled by a controlling signal of a controller; and
- coupling a discharging circuit to a capacitance unit of the converting module, wherein a resistance value of the discharging circuit is determined according to the discharging resistance value to have a time interval of the controlling signal generated by the controller being short than or equal to the predetermined time limit.

25. The method according to claim 24, wherein the predetermined time limit is shorter than a wavelength of human hearing range.

26. The method according to claim 25, wherein the discharging circuit comprises a voltage dividing circuit coupled to the converting module for generating a voltage feedback signal, and the controller generates the controlling signal according to the voltage feedback signal.

* * * * *